(12) United States Patent
Arnold et al.

(10) Patent No.: US 8,497,773 B2
(45) Date of Patent: Jul. 30, 2013

(54) MANAGING ADVERTISING DEVICES (75) Inventors: Brent D. Arnold, Grapevine, TX (US); Brian K. Reinle, Flower Mound, TX (US); Scott H. Galaise, Grapevine, TX (US)

(73) Assignee: Lites Out, LLC, Grapevine, TX (US)

( * ) Notice: Subject to any disclaimer, the term of this patent is extended or adjusted under 35 U.S.C. 154(b) by 1143 days.

(21) Appl. No.: 12/364,448

(22) Filed: Feb. 2, 2009

(65) Prior Publication Data

US 2009/0138363 A1 May 28, 2009

Related U.S. Application Data (63) Continuation of application No. 11/331,499, filed on Jan. 13, 2006, now Pat. No. 7,501,941.

(51) Int. Cl.
G08B 23/00 (2006.01)
G08B 1/08 (2006.01)
H04L 29/06 (2006.01)

(52) U.S. Cl.
USPC ........ 340/500; 340/5.9; 340/5.91; 340/539.1; 340/531; 340/641; 340/691.1

(58) Field of Classification Search
USPC .......................................... 340/500, 5.9, 5.91
See application file for complete search history.

(56) References Cited

U.S. PATENT DOCUMENTS

| | | | | |
|---|---|---|---|---|
| 5,254,908 A * | 10/1993 | Alt et al. | ......................... | 315/312 |
| 5,309,174 A * | 5/1994 | Minkus | ......................... | 345/204 |
| 5,844,181 A * | 12/1998 | Amo et al. | ..................... | 187/396 |
| 6,026,289 A * | 2/2000 | Zellner et al. | ................. | 455/403 |
| 7,501,941 B2 * | 3/2009 | Arnold et al. | ................. | 340/500 |
| 2005/0021393 A1 * | 1/2005 | Bao et al. | ......................... | 705/14 |
| 2006/0247983 A1 * | 11/2006 | Dalli | ............................... | 705/27 |

* cited by examiner

*Primary Examiner* — Donnie Crosland
(74) *Attorney, Agent, or Firm* — Patton Boggs LLP (57) ABSTRACT In one general aspect, a request to determine a status of a first of a plurality of advertising devices is received. The advertising devices are spatially separated. Operating conditions of the first advertising device are identified. The status of the first advertising device is determined based, at least in part, on the operating conditions. A presentation including information indicating the status of the first advertising device is transmitted.

43 Claims, 10 Drawing Sheets

FIGURE 2A

Enter Billboard ID: [___] [Detailed Overview] [GO] 🔍 Billboard Lookup  ❓ Help

LOG OUT

Welcome Billboard Company A

✉ You have 7 New messages
✉ You have 3 Old messages

INBOX     BILLBOARDS     COMPANY OPTIONS     FAQ

Schedule Changes for Today 9/14/2005

| Billboard ID | New "On" Time | New "Off" Time |
|---|---|---|
| BBCOA2451 | Sunset | Sunrise |
| BBCOA2349 | Sunset | Sunrise |
| BBCOA2348 | Sunset | Sunrise |
| BBCOA1235 | Sunset | Sunrise |

← 204

Scheduled Events (2)

Sept 2005

| Sun | Mon | Tue | Wed | Thu | Fri | Sat |
|---|---|---|---|---|---|---|
|  |  |  |  | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 | 29 | 30 |  |

You have 7 New messages
You have 3 Old messages

You can sort your inbox according to the Date and Problem Description.

| | Billboard ID | Date | Problem Description |
|---|---|---|---|
| ✉ | BBCOA2348 | 4/14/2005 | One lamp is out. |
| ✉ | BBCOA2346 | 4/17/2005 | Three Lamps out. |
| ✉ | BBCOA1235 | 4/18/2005 | One lamp is out. |
| ✉ | BBCOA1234 | 4/19/2005 | None of the lights are working |
| ✉ | BBCOA2456 | 6/10/2005 | One lamp is out. |
| ✉ | BBCOA2453 | 6/10/2005 | One lamp is out. |
| ✉ | BBCOA2452 | 6/10/2005 | One lamp is out. |
| ✉ | BBCOA2349 | 6/10/2005 | One lamp is out. |
| ✉ | BBCOA2347 | 6/10/2005 | One lamp is out. |
| ✉ | BBCOA2345 | 6/10/2005 | One lamp is out. |

← 116a

← 202

Color Chart
- ☐ Initial Problem
- ☐ 2nd Day with a Problem
- ☐ Problem has continued for 3-5 days
- ☐ Problem has continued for 5+ days. Fix Immediately

FIGURE 2B

Billboard Information: BBCOA2346

Billboard Name: Test 2

Address:
3003 Double Creek
Southlake, TX 76092

Close Window                Map It

Enter Billboard ID: [____] [Detailed Overview] [GO] 🔍 Billboard Lookup ❓ Help

116c

LOG OUT

Welcome Billboard Company A

✉ You have 7 New messages
✉ You have 3 Old messages

INBOX　　　　BILLBOARDS　　　COMPANY OPTIONS　　　FAQ

Billboards

Billboards 1 to 10 of 11

You can sort the results by Billboard ID, Zip Code, and Status

| Billboard ID | Address | Zip Code | Status |
|---|---|---|---|
| BBCOA2453 | 124 Satinwood | 76051 | Active |
| BBCOA2452 | 124 Satinwood | 76051 | Active |
| BBCOA2451 | 1401 superior dr | 75028 | Active |
| BBCOA2456 | 124 Satinwood | 76051 | Active |
| BBCOA2349 | 1234 easy street | 12345 | Active |
| BBCOA2348 | 2904 Ridgerow Dr. | 76051 | Active |
| BBCOA2347 | 2904 Ridgerow Dr. | 76034 | Active |
| BBCOA2346 | 3003 Double Creek | 76092 | Active |
| BBCOA2345 | 125 Myrtle Creek | 76051 | Active |
| BBCOA1235 | 125 Myrtle Creek | 76051 | Active |

〉 »

206

Scheduled Events (2)

Sept 2005

| Sun | Mon | Tue | Wed | Thu | Fri | Sat |
|---|---|---|---|---|---|---|
|  |  |  |  | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 | 29 | 30 |  |

LOG OUT

Enter Billboard ID: [BBCOA2453] [Detailed Overview ▼] [GO] 🔍 Billboard Lookup  ❓ Help Welcome Billboard Company A ✉ You have 7 New messages
✉ You have 3 Old messages INBOX     BILLBOARDS     COMPANY OPTIONS     FAQ

BBCOA2453:

Scheduling           Problem History This Billboard turns on at: Sunset
This Billboard turns off at: Sunrise To update this schedule, click here You have a Future Scheduled Event for this Billboard!
On Thursday, September 29, 2005 this Billboard will be scheduled to be turned OFF Information Address:
124 Satinwood
Grapevine, TX 76051

Description:

To update this information, click here

« Back to Billboard Listings

Scheduled Events (2)

Sept 2005

| Sun | Mon | Tue | Wed | Thu | Fri | Sat |
|-----|-----|-----|-----|-----|-----|-----|
|     |     |     |     | 1   | 2   | 3   |
| 4   | 5   | 6   | 7   | 8   | 9   | 10  |
| 11  | 12  | 13  | 14  | 15  | 16  | 17  |
| 18  | 19  | 20  | 21  | 22  | 23  | 24  |
| 25  | 26  | 27  | 28  | 29  | 30  |     |

LOG OUT

Enter Billboard ID: [_______] [Detailed Overview ▼] [GO] 🔍 Billboard Lookup ❓ Help Welcome Billboard Company A ✉ You have 7 New messages
✉ You have 3 Old messages

| INBOX | BILLBOARDS | COMPANY OPTIONS | FAQ |

Company Information

| Company | Billboard Company A |
|---|---|
| Billing Address | PO Box 712 |
| | Grapevine, TX 76099 |

Contact Information

| Contact Name | Brent Arnold |
|---|---|
| Phone Number | (817) 481-5252 |
| Fax Number | (817) 481-9494 |
| Email Address | brenta@litesout.com |

Reporting Billboard Problems ❓

You can choose how you would like to be notified in case there are problems with any Billboards Currently, you are being emailed Billboard problems  ☑ Uncheck to cancel Problems are being emailed to the
following selected emails Currently, you are being faxed Billboard problems  ☑ Uncheck to cancel Current fax number on record: (817) 481-9494
[Update]

Scheduled Events (2)

Sept 2005

| Sun | Mon | Tue | Wed | Thu | Fri | Sat |
|---|---|---|---|---|---|---|
|  |  |  |  | 1 | 2 | 3 |
| 4 | 5 | 6 | 7 | 8 | 9 | 10 |
| 11 | 12 | 13 | 14 | 15 | 16 | 17 |
| 18 | 19 | 20 | 21 | 22 | 23 | 24 |
| 25 | 26 | 27 | 28 | 29 | 30 |  |

Website Options ❓

There are a few additional options available that may make this website easier for you to use.

| Default Page | [Inbox (default) ▼] | This is the page that you will go to after you login |
|---|---|---|
| Search Item | [Status (default) ▼] | This is the item the Billboards Listing Page will sort by |
| Scheduled Events | ⦿ Calendar | Shows a graphical calendar with scheduled events ❓ |
| | ○ Text | Shows scheduled events by date ❓ |
| Show Help Tips | ☐ | Check this if you want to see the help tips menu on the right |

[Update]

MANAGING ADVERTISING DEVICES

PRIORITY

This application is a Continuation of Ser. No. 11/331,499, entitled: MANAGING ADVERTISING DEVICES, filed on Jan. 13, 2006 now U.S. Pat. No. 7,501,941, which is incorporated herein by reference.

BACKGROUND OF THE INVENTION

An organization's advertising devices (e.g., billboards, video displays) are typically managed through conventional means such as by assigning the equipment to an individual or department and periodically physically inspecting the devices to ensure they are operating and/or to change operating conditions. Generally, advertising devices include components that are electrical and/or mechanical and are exposed to environmental conditions beyond the control of the organization. For example, a billboard includes lamps that may be exposed to rain, snow, hail, high temperatures, and other extreme operating conditions. As a result, the components may not operate as intended and may in fact fail to operate due to such conditions. There may be a delay between failure of the advertising device and physical inspection. Such delays prevent advertising devices from providing information to target audiences.

SUMMARY

In one general aspect, a request to determine a status of a first of a plurality of advertising devices is received. The advertising devices are spatially separated. Operating conditions of the first advertising device are identified. The status of the first advertising device is determined based, at least in part, on the operating conditions. A presentation including information indicating the status of the first advertising device is transmitted.

Implementations may include one or more of the following features. In response to at least one component violating specified operating conditions, a notification indicating the violation is generated. The notification is transmitted to a user via a network. The advertising device comprising a billboard, and the component comprises a lamp. A request to update the operating conditions of the first advertising device is received. A command based, at least in part, on the selection is transmitted to the first advertising device.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like components.

DETAILED DESCRIPTION

Figure 1:
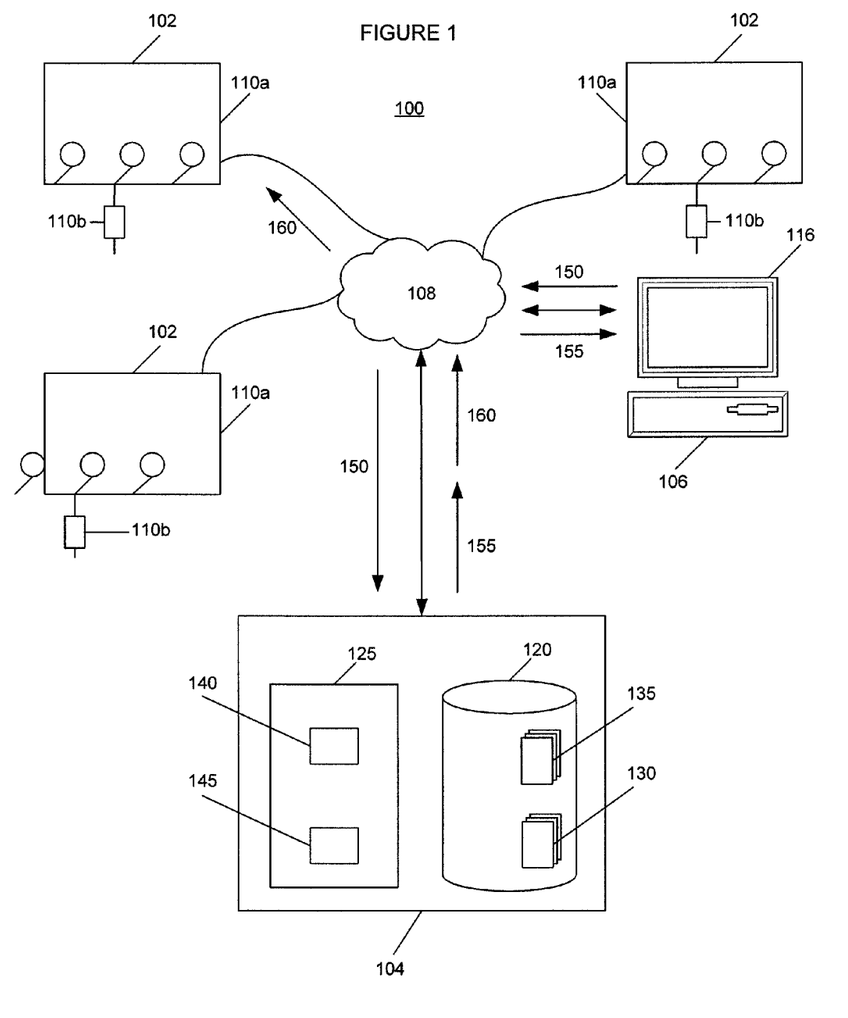
FIG. 1 is a block diagram illustrating a management system.

FIG. 1 illustrates one example of an advertising device management system 100. At a high level, system 100 is a client/server environment comprising a plurality of advertising devices 102, a server 104, and at least one client 106 communicably coupled via a network 108, but system 100 may also be a standard computing environment or any other suitable environment. In general, management system 100 is operable to identify a plurality of advertising devices 102, receive a selection from a user of client 106, and independently manage one of the plurality of advertising devices 102 in response to the user selection. Therefore, management system 100 may allow a user to remotely manage each of a plurality of advertising devices 102. Put another way, management system 100 may enable the user to control advertising device 102 via a graphical user interface (GUI). Generally, in order to maintain advertising devices 102 in operating conditions, an individual would have to periodically physically inspect each advertising device 102 to ensure that device components (e.g., power supply, light source) were operating correctly. Managing advertising devices 102 may become extremely burdensome as the number of advertising devices 102 increases. To overcome this burden, management system 100 may enable the user to remotely monitor and/or control a power supply or other components associated with advertising device 102. As a result, management system 100 may reduce, minimize, or eliminate time needed to physically inspect each advertising device 102 to maintain them in operating conditions. Further, management system 100 may allow more customized and independent control of operational timing of advertising devices 102. In some embodiments, intelligence of management system 100 is centrally located at server 104, and, in this case, server 104 manages individual advertising devices 102 independent of other advertising devices 102. In other words, server 104 may independently turn on and off individual advertising devices by transmitting a message routed directly to the specific advertising devices.

Advertising device 102 can include any hardware, software, and/or firmware operable to provide advertising information to individuals and/or devices within a proximity of advertising device 102. Advertising information may include a static visual display (e.g., billboard), a dynamic display (e.g., video display), video, audio, text, an electromagnetic signal encoding data (e.g., Bluetooth), and/or other information. In some embodiments, advertising device 102 may include components 110 (e.g., lights, controller, camera, receiver, transmitter, override switch, push-to-talk button) that enable advertising device 102 to provide associated advertising information. For example, advertising device 102 may comprise a billboard with lights 110a to illuminate a billboard. In this case, a billboard may be single, double-faced, or multi-faced displays with associated lights 110a. In addition, advertising device 102 may include a controller 110b for controlling power to other components associated with advertising device 102. In some embodiments, controller 110b may be attached to existing circuitry of a billboard. In some embodiments, controller 110b is operable to periodically transmit operating parameters to server 104 such as amps, watts, or others. To enable wireless communication with network 108, advertising device 102 may include a receiver and transmitter operable to receive signals from and transmit signals to network 108. In some embodiments, advertising device 102 maintains a connection to the GSM/GPRS network for receiving and transmitting data. Advertising device 102 may use other suitable wireless protocols such as a wireless modem. Advertising device 102 may be able to process SMS messaging for back-up communication or expanding features. Advertising device 102 may receive commands to supply and/or shut down power to components 110 such as lights 110a. In some examples, advertising device 102 transmits diagnostic information such that the operating condition of advertising device 102 may be determined. In some embodiments, advertising device 102 includes a CDPD (Cellular Digital Packet Data) or GPRS (General Packet Radio Service) wireless modem. In addition, advertising device 102 may include a push-to-talk button enabling technicians to discuss the advertising device 102 with a customer and/or technical support. In any case, advertising device 102 is communicably coupled to server 104 via network 108.

Network 108 facilitates wireless or wireline communication between advertising devices 102, server 104, client 106 and any other local or remote computer. Network 108 encompasses any internal or external network, networks, sub-network, or combination thereof operable to facilitate communications between various computing components in system 100. Network 108 may communicate, for example, Internet Protocol (IP) packets, Frame Relay frames, Asynchronous Transfer Mode (ATM) cells, voice, video, data, and other suitable information between network addresses. Network 108 may include one or more local area networks (LANs), radio access networks (RANs), metropolitan area networks (MANs), wide area networks (WANs), all or a portion of the global computer network known as the Internet, and/or any other communication system or systems at one or more locations.

Client 106 is any local or remote computing device operable to transmit requests 150 to server 104 and present output (such as properties or reports of advertising devices 102) via a GUI 116. At a high level, client 106 includes at least GUI 116 and comprises an electronic computing device operable to receive, transmit, process and store any appropriate data associated with system 100. It will be understood that there may be any number of clients 106 communicably coupled to server 104. Further, reference to "client 106" generally may be replaced by the term "user," and vice versa, throughout. As used in this disclosure, client 106 is intended to encompass a personal computer, touch screen terminal, workstation, network computer, kiosk, wireless data port, wireless or wireline phone, personal data assistant (PDA), one or more processors within these or other devices, or any other suitable processing device or computer. For example, client 106 may comprise a computer that includes an input device, such as a keypad, touch screen, mouse, or other device that can accept information, and an output device that conveys information associated with the operation of server 104 or clients 106, including digital data, visual information, or GUI 116. Both the input device and output device may include fixed or removable storage media such as a magnetic computer disk, CD-ROM, or other suitable media to both receive input from and provide output to users of clients 106 through the display, namely GUI 116.

GUI 116 comprises a graphical user interface operable to allow the user of client 106 to interface with at least a portion of system 100 for any suitable purpose. Generally, GUI 116 provides the user of client 106 with an efficient and user-friendly presentation of data provided by or communicated within system 100. For example, GUI 116 may be a front-end of monitoring engine 140 (discussed below) and provide functionality to monitor operating conditions and alerts associated with advertising devices 102. Conceptually, the user logs into server 104 (may be secured access) through GUI 116, which then presents a list of advertising devices 102. By selecting a particular advertising device 102, GUI 116 may display activity history, alert history, operating conditions, scheduled activity, and other information associated with advertising device 102. For example, GUI 116 may display one or more of the following: index of faults and associated time periods, maintenance log including time of fault detection and repair, maintenance cost graph, historical data, graphical representation of energy costs, real-time pictorial representation of lighting status, or layered access to managed advertising devices (e.g., regional, local, maintenance levels). Using GUI 116, the user can define directives in order to control operations of a particular advertising device 102. Put in other words, the user may also control advertising devices 102 using this particular view of GUI 116. For example, the user can start, stop, or suspend the activity of advertising device 102. In addition, GUI 116 may provide alerts determined by server 104 or in response to a particular directive.

Regardless of the particular data, GUI 116 may comprise a plurality of customizable frames or windows having interactive fields, pull-down lists, and buttons operated by the user. In some embodiments, GUI 116 presents device information associated with advertising devices 102, including operating conditions, and associated buttons and receives commands from the user of client 106 via one of the advertising devices 102. This information may be presented in tabular, graphical, and any other suitable format. Moreover, it should be understood that the term graphical user interface may be used in the singular or in the plural to describe one or more graphical user interfaces and each of the displays of a particular graphical user interface. Therefore, GUI 116 can include any graphical user interface, such as a generic web browser or touch screen, that processes information in system 100 and efficiently presents the results to the user. Server 104 can accept data from client 106 via the web browser (e.g., Microsoft Internet Explorer or Netscape Navigator) and return the appropriate HTML or XML responses using network 108. For example, server 104 may receive a status request 150 from client 106 using the web browser, retrieve data from the particular device profile 130, and present the results in the web browser.

Illustrated server 104 includes memory 120 and processor 125 and comprises an electronic computing device operable to receive, transmit, process and store data associated with system 100. For example, server 104 may be any computer or processing device such as, for example, a blade server, general-purpose personal computer (PC), Macintosh, workstation, Unix-based computer, or any other suitable device. Generally, FIG. 1 provides merely one example of computers that may be used with the disclosure. For example, although FIG. 1 illustrates one server 104 that may be used with the disclosure, server 104 can be implemented using computers other than servers, as well as a server pool. Server 104 may be adapted to execute any operating system including Linux, UNIX, Windows Server, z/OS or any other suitable operating system. But, servers other than general purpose computers as well as servers without conventional operating systems can be used. According to some embodiments, server 104 may also include or be communicably coupled with a web server and/or a data server.

Memory 120 may include any memory or database module and may take the form of volatile or non-volatile memory including, without limitation, magnetic media, optical media, random access memory (RAM), read-only memory (ROM), removable media, or any other suitable local or remote memory component. In this embodiment, illustrated memory 120 stores device profiles 130 and configuration files 135, but may also include any other appropriate data such as a activity history, print or other reporting files, HTML files or templates, and others. Device profiles 130 include one or more entries or data structures that describe a profile of an advertising device 102 and/or a group of advertising devices 102. For example, a device profile 130 may include, indicate, or reference one or more of the following: a device name, a device ID, a device type, an associated group name, list of on-going faults, maintenance log, maintenance costs, log of energy consumption, a manufacturer name, a model name, a component name, a component version, a configuration setting, a geographic location (e.g., street address), networking information, and/or any other suitable information associated with advertising device 102 and/or group of advertising devices 102. Device profile 130 may identify components 110 associated with a specific advertising device 102 such as lights 110a and controller 110b. In addition, device profile 130 may be associated with an individual and/or group of advertising devices 102. Device profiles 130 may be stored in any suitable format such as, for example, an extensible Markup Language (XML) document, a flat file, comma separated value (CSV) file, a name-value pair file, SQL table, or others. Indeed, each device profile 130 may be a temporary or a persistent data structure without departing from the scope of the disclosure. Device profiles 130 are typically generated or loaded based on data or other configuration information received or retrieved from advertising device 102. But device profiles 130 may also be created, updated, or supplied by server 104, a third-party software vendor, or any appropriate user of any computer in system 100, loaded from a default profile, or received via network 108.

Each configuration file 135 may include parameters, variables, policies, algorithms, instructions, settings, or directives used by server 104 for managing advertising devices 102. In some examples, configuration file 135 includes directives used to access, retrieve, and process information from advertising device 102. Configuration file 135 may include technical data such that server 104, using the technical data, may access and retrieve data from advertising device 102 and determine operating conditions of advertising device 102 based, at least in part, on the retrieved data. For example, configuration file 135 may provide directives for retrieving power consumption information from controller 110b and determining whether the power consumption indicates that all lights 110a are operating normally. In addition, configuration file 135 may include directives for adjusting, altering, or otherwise controlling settings of a specific advertising device 102. In this case, the user may be able to adjust the schedule of a specific advertising device 102 via client 106 without requiring an individual having to go to the site. In some embodiments, configuration file 135 stores a schedule such as timing settings that may be adjusted by the user using client 106. For example, configuration file 135 may include directives to turn lights 110a on at a specific time and to turn lights 110a off at a specific time. Configuration file 135 may include multiple ON/OFF events, weekday and weekend schedules, future scheduling, or other types of scheduling. In other words, the directives may include a schedule transmitted to a timer associated with advertising device 102 for updating the operation of the time in accordance with the schedule. In addition to a set schedule, the user may be capable of controlling the operating conditions at times outside the scope of the schedule. In some embodiments, configuration file 135 may include directives to transmit on and off commands to advertising device 102 in accordance with a schedule. Configuration file 135 may include directives to adjust operating conditions of different sides of a specific advertising device 102 at different times. In some examples, configuration file 135 may include directives to adjust lighting loads based on seasonal changes of sunset and sunrise times such as automatically changing times based on daylight savings time. In some examples, the sunrise and sunset times are based on the U.S. Naval Observatory depending on the physical location of each advertising device 102. In some examples, the operating conditions of the advertising devices 102 may be based on monetary budgets such as total monthly operating costs. In other words, the user may control an advertising device 102 based on cost, not time.

Technical information included in configuration file 135 may include one or more of the following: a network address, login information, list of commands, list of parameters associated with commands, controller 110b capabilities, or information associated with retrieving and/or processing device data. Of course, the above parameters are for example purposes and may not reflect certain embodiments within the scope of this disclosure. In some embodiments, configuration file 135 includes or indicates automatic actions to take in response to determining specific operating conditions. For example, configuration file 135 may indicate that controller 110b should be shut down in the event of a short. In the billboard embodiment, such operating conditions may include one or more of the following: power outage, tripped breaker, lamp outage, or ballast failure. Each configuration file 135 may be associated with a specific advertising device 102 or a plurality of advertising devices 102 or a plurality of advertising devices 102 may be associated with a specific configuration file 135. In some embodiments, configuration files 135 may be formatted, stored, or defined as various data structures in text files, XML documents, flat files, retrieve files, CSV files, internal variables, or one or more libraries.

Server 104 also includes processor 125. Processor 125 executes instructions and manipulates data to perform the operations of server 104 such as, for example, a central processing unit (CPU), a blade, an application specific integrated circuit (ASIC), or a field-programmable gate array (FPGA). Although FIG. 1 illustrates a single processor 125 in server 104, multiple processors 125 may be used according to particular needs and reference to processor 125 is meant to include multiple processors 125 where applicable. In the illustrated embodiment, processor 125 executes monitoring engine 140 and presentation engine 145.

Monitoring engine 140 is any software operable to dynamically implement configuration files 135 to manage advertising devices 102 and automatically respond to, notify of, or otherwise process aberrant operating conditions. As used herein, "software" includes any combination of hardware, software, or firmware as appropriate. For example, monitoring engine 140 may be written or described in any appropriate computer language including C, C++, Java, J#, Visual Basic, assembler, Perl, any suitable version of 4GL, as well as others. In some embodiments, monitoring engine 140 receives request 150 to monitor advertising device 102 (e.g., energy consumption) from client 106. Request 150 may include a user name, a password, an identifier of advertising device 102, or any other suitable information. Based, at least in part, on request 150, monitoring engine 140 identifies a particular configuration file 135 associated with the identified advertising device 102 and retrieves device information from the identified advertising device 102 in accordance with the particular configuration file 135. Monitoring engine 140 may communicate with advertising device 102 using the UDP/TCP protocol. In some embodiments, monitoring engine 140 receives raw data (e.g., amps, watts) from the advertising device 102, processes it and determines errors or status of the advertising device 102. Monitoring engine 140 may determine one or more the following that may be included in incoming threads: modem ID, IP address, signal strength, readings, I/O status, command sets, event settings, or others.

After retrieving data, monitoring engine 140 may determine operating conditions of advertising device 102 in accordance with the associated configuration file 135. For example, monitoring engine 140 may use directives retrieved from configuration file 135 and the retrieved data to determine if the power consumption of advertising device 102 is within a specific range. In some examples, power consumption outside the specific range indicates that one or more lights 110a (or bulbs) are burnt out. Other detectable errors may include power outage, tripped breaker, lamp outage, ballast failure, or others. In some embodiments, the monitoring engine 140 may process true RMS measurements for fault detections. As a result, maintenance crews may be able to have the proper material for repair with knowledge and diagnosis of the problems before arriving at the site. In response to the determination, monitoring engine 140 may transmit commands to advertising device 102 such as shut down or increase power supply. In some embodiments, monitoring engine 140 transmits requests to a specific advertising device 102 using a network address operable to route the message through a network to the specific advertising device 102. As a result, monitoring engine 140 may independently control specific advertising devices 102 without broadcasting commands. For example, each advertising device 102 may be dynamically assigned an IP address such that a request may be routed through a packet-switched network to the advertising device 102 using the IP address. In some instances, some or each advertising devices 102 may be assigned a static IP address. In addition, monitoring engine 140 may verify states of controller 110b upon power outages or reception of a new IP address.

Based on retrieved data from advertising device 102, monitoring engine 140 may determine violations of directives included in configuration files 135 by, for example, comparing the data to the directives. In response to determining a violation, the monitoring engine 140 may automatically communicate an alert and/or record the occurrence in device profile 130. For example, an alert may include sending an email to particular personnel, communicating a message to client 106 or another computer in the network 108, updating a display including information associated with advertising device 102, or other appropriate action. An alert may also included aggregating a record of aberrant operating conditions in device profile 130 and transmitting a notice to the user if the aberrant operating conditions exceed a specified amount of time.

In the illustrated embodiment, network 108 may execute or process presentation engine 145 that automatically generates GUI 116 based, at least in part, on device profile 130. In some embodiments, presentation engine 145 may generate GUI 116 in response to data retrieved from advertising device 102 and/or determination of operating conditions of advertising device 102. Presentation engine 145 could include any hardware, software, firmware, or combination thereof operable to receive a client's request 150 from client 106, retrieve data from device profile 130, automatically generate GUI 116, and populate GUI 116 with retrieved data.

In one aspect of the operation, client 106 receives a selection from a user via GUI 116 to provide a status of an advertising device 102. In response to the selection, client 106 transmits a request 150 to server 104 via network 108. Based, at least in part on request 150, monitoring engine 140 identifies one or more device profiles 130 associated with advertising device 102. Using the associated device profiles 130, presentation engine 145 retrieves operating parameters. Presentation engine 145 generates a GUI 116 and, in accordance with request 150, populates GUI 116 with associated data from device profiles 130. Presentation engine 145 transmits a response 155 including GUI 116 to client 106 to present the requested data to the user. In response to at least the data presented by GUI 116, the user may issue a command to server 104. For example, the user may issue a command to activate an override switch of advertising device 102 to enable maintenance to be performed. Activating an override switch will override the current operating settings of an advertising device 102 to shut down the advertising device 102. As a result, when a specific advertising device 102 needs to be repaired, an individual advertising device 102 may be shut down allowing a maintenance worker to safely work with the specific advertising device 102.

FIGS. 2A-E are example displays for presenting various properties of advertising devices 102 in accordance with one embodiment of system 100. It will be understood that illustrated web pages 116a-116e, respectively, are for example purposes only. Accordingly, GUI 116 may include or present data in any format or descriptive language and each page may present any appropriate data in any layout.

Figure 2A:
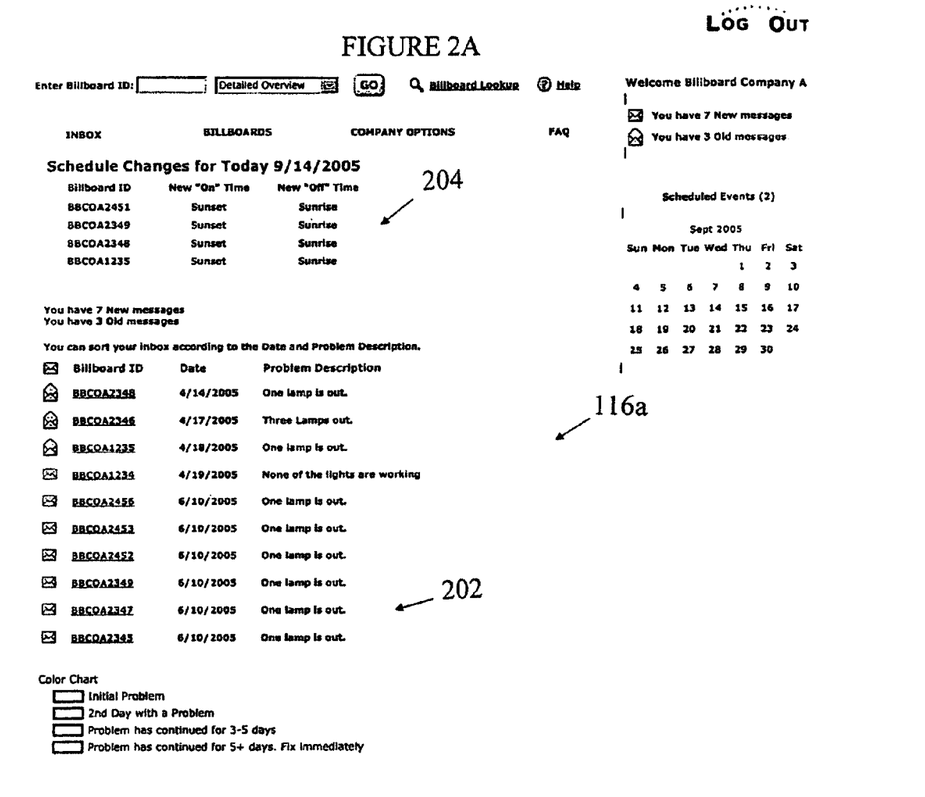
FIGS. 2A-2E are example Graphical User Interfaces (GUIs) of FIG. 1.
Figure 2B:
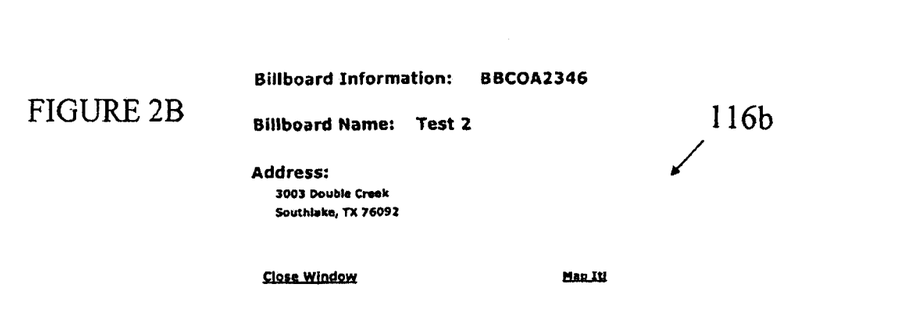

Turning to the illustrated embodiments, FIG. 2A illustrates an example status view 116a. In this view 116a, the user may be able to view information indicating problems with particular advertising devices 102 and changes that may be applied to particular advertising devices 102 that day. In other words, status view 116a is a graphical representation of a summary of problems and duration of the identified problem. In the illustrated embodiments, status view 116a includes a problem table 202 and a schedule table 204. Each table includes a spreadsheet with several columns and rows, with each intersection comprising a cell. Each cell is populated with information associated with jobs or alerts. The illustrated problem table 202 includes three columns: Billboard ID, Date, and Problem Description. The problem table 202 includes a row for each billboard that includes a problem with a light 110a. In the event that the user wants to identify the location of the particular billboard, the user may select the billboard ID in the problem table 202. In response to the selection, server 104 may generate GUI 116b illustrated in FIG. 2B indicating a street address of the billboard. Each row may be color coded to indicate the duration of a problem with the identified billboard. In some embodiments, the problem table 202 may be sorted by date or problem description. The illustrated schedule table 204 includes the three columns: Billboard ID, New "On" Time, and New "Off" Time. The schedule table 204 includes a row for each billboard whose on and off times will be changed that day.

Figure 2C:
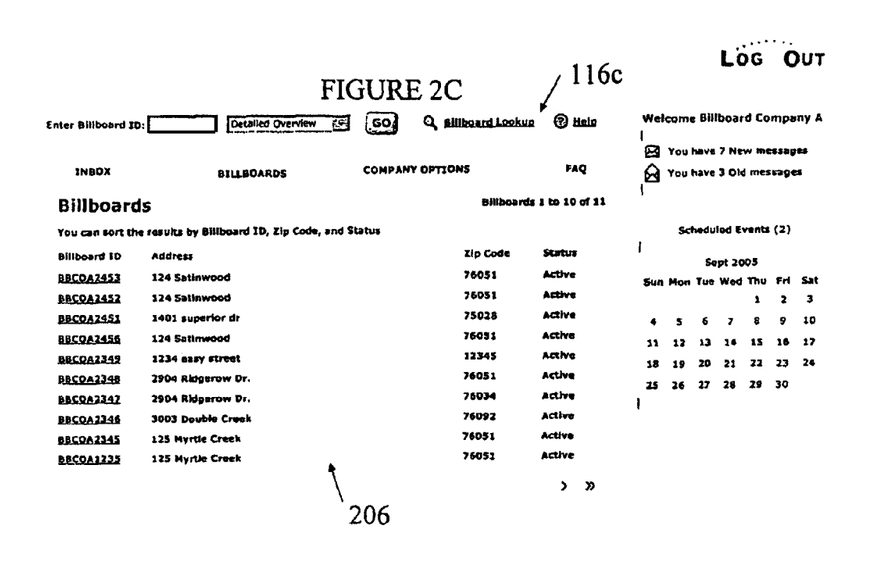
Figure 2D:
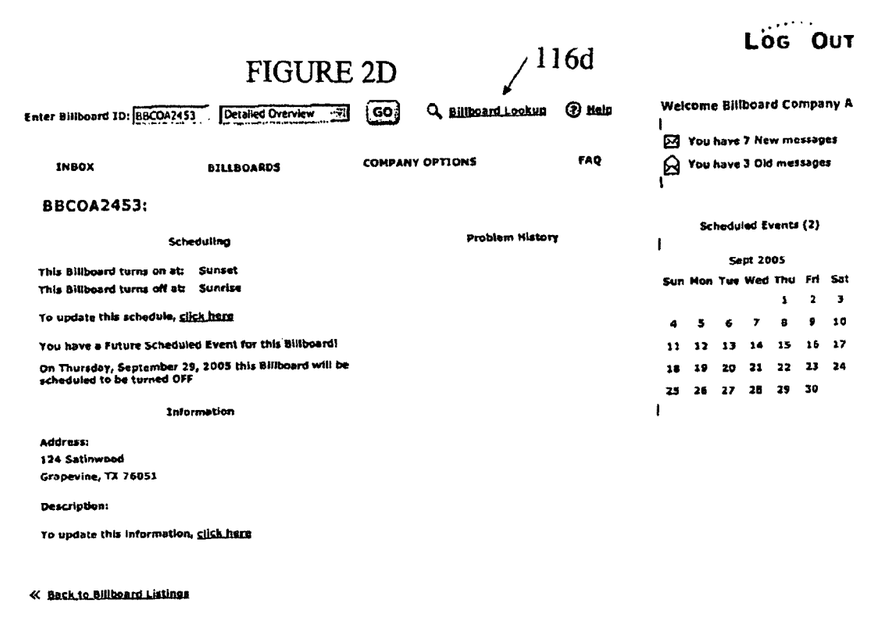

FIG. 2C illustrates an example summary view 116c. In this view 116c, the user may be able to view billboards associated with the user. For example, the user may be able to view all billboards associated with a particular company or other entity. In other words, view 116c is a graphical representation of a summary of billboards. In the illustrated embodiments, summary view 116c includes a status table 206. The illustrated status table 206 includes four columns: Billboard ID, Address, Zip Code, and Status. The status table 204 includes a row for each billboard associated with the user. In some embodiments, the status table 206 may be sorted by date, zip code, and/or status. In the event that the user wants to view additional information associated with the particular billboard, the user may select the billboard ID in the status table 206. In response to the selection, server 104 may generate GUI 116d illustrated in FIG. 2D indicating scheduling and location information associated with the billboard. The scheduling information may indicate the schedule that components 110 are adjusted, such as the times that the lights 110a are turned on and off. The location information may identify a street address.

Figure 2E:
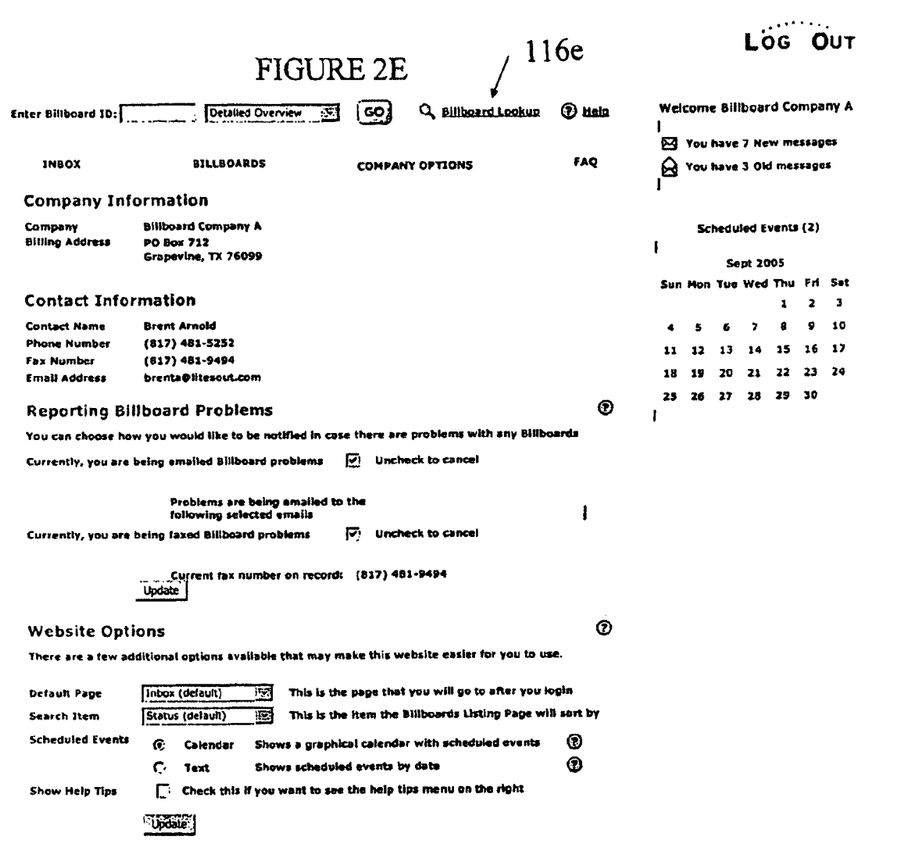

FIG. 2E illustrates a company view 116e. In this view 116e, the user may be able to view information indicating the company (or entity) associated with billboards, contact information, and preferences. In other words, company view 116e is a graphical representation of a summary of the company and preferences. For example, the company view 116e may identify the company name and address along with the contact information of the user. The user may also select the method that monitoring engine 140 notifies the user of a problem with a particular billboard. For example, monitoring engine 140 may email or fax the user in response to detecting a problem. In some embodiments, monitoring engine 140 may notify multiple users of a problem. The company view 116e may include other preferences such as login preferences, sorting of summary view 116c, illustrating scheduled events, and others.

Figure 3:
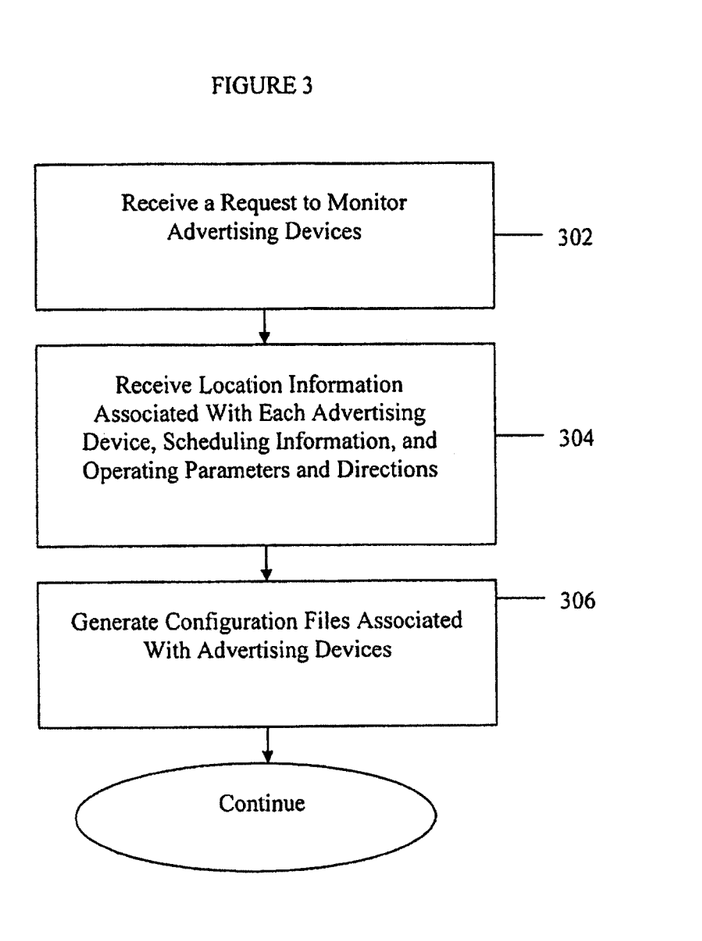
FIG. 3 is a flow diagram for managing advertising devices of FIG. 1.

FIG. 3 illustrates a flow diagram implementing an example process for using management system 100 of FIG. 1 to verify activities of an individual. Process 300 is described with respect to management system 100 of FIG. 1, but process 300 could be used by any other application or applications. Thus, many of the steps in this flowchart may take place simultaneously and/or in different orders as shown. Further, management system 100 may execute logic implementing techniques similar to one or both of process 300 in parallel or in sequence, management system 100 may also use processes with additional steps, fewer steps, and/or different steps, so long as the processes remain appropriate.

Process 300 begins with step 302 where monitoring engine 140 receives a request to monitor advertising devices 102 associated with an enterprise or other entity. Next, at step 304, monitoring engine 140 receives location information, scheduling information, and operating parameters and directives associated with each advertising devices 102. At step 306, monitoring engine 140 generates configuration files 135 associated with advertising devices 102 for providing associated directives. Monitoring engine 140 generates a device profile 130 for each advertising device 102 for recording status information at step 308. At step 310, monitoring engine 140 associates each device profile 130 with a corresponding configuration file 135. After generating device profiles 130 and configuration files 135, monitoring engine 140 monitors advertising devices 102 in accordance with configuration files 135 at step 312. At step 314, monitoring engine 140 updates associated device profiles 130 with data retrieved from advertising devices 102. If monitoring engine 140 determines a violation of a parameter included in a configuration file 135 at decisional step 316, then, at step 318, monitoring engine 140 transmits a notification to the user.

At step 320, monitoring engine 140 receives a status request 150 from a user of client 106. In response to request 150, monitoring engine 140 identifies the device profiles 130 associated with the user at step 322. In addition, monitoring engine 140 identifies configuration files 135 associated with the identified device files 130. Next, at step 326, monitoring engine 140 retrieves current operating parameters from advertising devices 102. The current data is merged with the data stored in device profiles 130 at step 328. At step 334, presentation engine 145 generates a GUI 116 including at least a portion of the data. Presentation engine 145 transmits GUI 116 to client 106 for presenting to the user at step 336. If a selection is made by the user at decisional step 338, presentation engine 145 generates a new and/or updates GUI 116 in accordance with the user selection at step 340. Presentation engine 145 transmits GUI 116 to the user at step 342.

Although this disclosure has been described in terms of certain embodiments and generally associated methods, alterations, and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed as new and desired to be protected by Letters Patent of the United States is:

1. A method for monitoring the operating conditions of a plurality of billboards, the method comprising:
   receiving operating conditions for the plurality of billboards through a digital packet network, wherein the plurality of billboards each includes a wireless transceiver to wirelessly transmit the operating conditions to the digital packet network;
   determining a configuration file associated with one of the plurality of billboards;
   determining a status of the one of the plurality of billboards in response to comparing the received operating conditions that are associated with the one of the plurality of billboards to the determined configuration file, the configuration file including the desired operating conditions for the one of the plurality of billboards; and
   communicating an alert, the alert including information representative of the operating conditions of the one of the plurality of the billboards;
   wherein the operating conditions of the plurality of billboards are the parameters under which the plurality of billboards operate in order to present advertising information.

2. The method of claim 1, wherein receiving operating conditions for a plurality of billboards comprises receiving operating conditions for a static visual display.

3. The method of claim 1, wherein receiving operating conditions for a plurality of billboards comprises receiving operating conditions for a dynamic visual display.

4. The method of claim 1, wherein receiving operating conditions for a plurality of billboards comprises receiving operating conditions for a video display.

5. The method of claim 1, wherein receiving operating conditions for a plurality of billboards comprises receiving operating conditions for an electronic billboard.

6. The method of claim 1, wherein receiving operating conditions for a plurality of billboards comprises receiving an indication of a tripped breaker.

7. The method of claim 1, wherein receiving operating conditions for a plurality of billboards comprises receiving an indication of a ballast failure.

8. The method of claim 1, wherein receiving operating conditions for a plurality of billboards comprises receiving operating conditions of a maintenance visit.

9. The method of claim 1, wherein receiving operating conditions for a plurality of billboards comprises receiving an indication of an override.

10. The method of claim 1, wherein communicating the alert further comprises messaging an end user device of a designated individual.

11. The method of claim 1, wherein the method further comprises receiving commands through the digital packet network, the commands operable to update the operating conditions.

12. The method of claim 1, wherein the method further comprises receiving commands through the digital packet network to modify operation of the one of the plurality of billboards.

13. The method of claim 1, wherein receiving operating conditions comprises receiving operating conditions indicative of a power supply and wherein determining the status includes determining if the one of the plurality of billboards has a power failure.

14. The method of claim 1, wherein determining the status includes determining if the one of the plurality of billboards has violated specified operating conditions.

15. The method of claim 1, wherein determining the status includes determining if the one of the plurality of billboards has experienced a lighting failure.

16. The method of claim 1, wherein receiving operating conditions for a plurality of billboards includes receiving a schedule for modifying the operating conditions for the plurality of billboards.

17. The method of claim 1, wherein receiving operating conditions for a plurality of billboards includes receiving a schedule for modifying the operating conditions for the plurality of billboards and wherein the method further comprises receiving commands through the digital packet network to modify the schedule.

18. A system for monitoring the operation of a billboard, the system comprising:
a processor;
a memory in communication with the processor, the memory including instructions operable when executed by the processor to:
receive operating conditions for the plurality of billboards through a digital packet network, wherein the plurality of billboards includes a wireless transceiver to wirelessly transmit the operating conditions to the digital packet network;
determine a configuration file associated with one of the plurality of billboards;
determine a status of the one of the plurality of billboards in response to comparing the received operating conditions that are associated with the one of the plurality of billboards to the determined configuration file, the configuration file including the desired operating conditions for the one of the plurality of billboards; and
communicate an alert, the alert including information representative of the operating conditions of the one of the plurality of the billboards
wherein the operating conditions of the plurality of billboards are the parameters under which the plurality of billboards operate in order to present advertising information.

19. The system of claim 18, wherein the alert is a message communicated to an end user device of a designated individual.

20. The system of claim 18, wherein at least one of the plurality of billboards is a dynamic visual display.

21. The system of claim 18, wherein the instructions are further operable when executed by the processor to receive commands through the digital packet network, the commands operable to update the operating conditions.

22. The system of claim 18, wherein the instructions are further operable when executed by the processor to receive commands through the digital packet network, the commands operable to modify the operation of the plurality of billboards.

23. The system of claim 18, wherein the status is a power failure.

24. The system of claim 18, wherein the status is a violation of a specified operating condition.

25. The system of claim 18, wherein the status is a lighting failure.

26. The system of claim 18, wherein the instructions are further operable when executed by the processor to receive a schedule for modifying the operating conditions for at least one of the plurality of billboards.

27. A control system for a billboard, the control system comprising:
a light source operable to illuminate the billboard;
a power supply electrically coupled to the light source and operable to power the light source;
a controller electrically coupled to the power supply and operable to control the power supply; and
a transceiver in communication with the controller and operable to receive a command over a wireless network, the command being associated with operating conditions of the billboard;
wherein the operating conditions are the parameters under which the billboard is intended to operate in order to present advertising information, and wherein the controller is operable to control the power supply in response to the command.

28. The control system of claim 27, wherein the control system is responsive to messaging with an end-user device to control one or more of the operating conditions.

29. The control system of claim 27, the light source being disposed relative to a dynamic display to provide illumination of the dynamic display.

30. The control system of claim 27, the light source being embedded within a video display to illuminate pixels of the video display.

31. The control system of claim 27, the light source being embedded within an electronic billboard to illuminate pixels of the electronic billboard.

32. The control system of claim 27, the controller being further electrically coupled to the light source and operable to control the light source, wherein the transceiver is further operable to communicate operating conditions associated with the light source over a digital packet network to a server, the server operable to provide information to one or more clients regarding the operating conditions of the light source.

33. The control system of claim 27, the command being a command for the controller to modify control of the power supply.

34. The control system of claim 27, the command being a command for the controller to modify control of the light source.

35. The control system of claim 27, the command being a command for the controller to modify a schedule associated with the billboard.

36. A method for controlling the operation of a billboard, the method comprising:
receiving a command at a transceiver of the billboard from a wireless network, the command being associated with operating conditions of the billboard;
communicating the command from the transceiver to a controller of the billboard, the controller being operable to control operating conditions of the billboard; and
modifying operating conditions of the billboard in response to the command;

wherein the operating conditions of the billboard are the parameters under which the billboard operates in order to present advertising information.

37. The method of claim 36, wherein the command received at the transceiver is received in response to messaging over a network with an end-user device.

38. The method of claim 36, wherein modifying the operating conditions of the billboard comprises modifying a light source.

39. The method of claim 36, wherein modifying the operating conditions of the billboard comprises modifying a schedule associated with the display of the billboard.

40. The method of claim 36, wherein modifying the operating conditions of the billboard comprises modifying a schedule associated with the illumination of the billboard.

41. The method of claim 36, wherein modifying the operating conditions of the billboard comprises modifying a schedule associated with the light source.

42. The method of claim 36, wherein modifying the operating conditions of the billboard comprises modifying a schedule associated with the power supply.

43. The method of claim 36, wherein modifying the operating conditions of the billboard comprises controlling a display on each of multiple sides of the billboard.

\* \* \* \* \*